(12) United States Patent
Rebholz

(10) Patent No.: US 7,163,094 B2
(45) Date of Patent: Jan. 16, 2007

(54) HYDRAULICALLY ACTUATABLE GEARSHIFT SYSTEM COMPRISING A SYNCHRONIZING DEVICE

(75) Inventor: Wolfgang Rebholz, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 105 days.

(21) Appl. No.: 10/519,446

(22) PCT Filed: Jun. 26, 2003

(86) PCT No.: PCT/EP03/06735

§ 371 (c)(1),
(2), (4) Date: Dec. 29, 2004

(87) PCT Pub. No.: WO2004/005738

PCT Pub. Date: Jan. 15, 2004

(65) Prior Publication Data

US 2005/0241903 A1    Nov. 3, 2005

(30) Foreign Application Priority Data

Jul. 2, 2002    (DE) ............................... 102 29 513

(51) Int. Cl.
*F16D 23/04*    (2006.01)
(52) U.S. Cl. ............................... 192/53.361; 192/69.9; 192/85 A

(58) Field of Classification Search ........... 192/53.361, 192/69.9
See application file for complete search history.

(56) References Cited

U.S. PATENT DOCUMENTS

| 1,973,807 | A | * | 9/1934 | Grinham et al. ............... 74/339 |
| 2,092,580 | A | * | 9/1937 | Kelley ....................... 192/87.14 |
| 3,860,101 | A | | 1/1975 | De Feo et al. |
| 4,069,803 | A | * | 1/1978 | Cataldo .................. 123/198 F |
| 4,131,185 | A | | 12/1978 | Schall |
| 4,603,596 | A | * | 8/1986 | Akashi et al. ............ 74/336 R |
| 5,337,872 | A | * | 8/1994 | Kawamura et al. .... 192/107 M |
| 5,560,461 | A | | 10/1996 | Loeffler |
| 6,250,446 | B1 | * | 6/2001 | Leite ........................ 192/53.35 |

FOREIGN PATENT DOCUMENTS

| DE | 43 25 964 A1 | 1/1995 |
| DE | 37 11 490 C2 | 4/1995 |
| DE | 200 22 345 U1 | 8/2001 |
| FR | 2 388 173 | 11/1978 |
| GB | 879436 | 10/1961 |
| GB | 2 214 248 A | 8/1989 |

* cited by examiner

*Primary Examiner*—Richard M. Lorence
(74) *Attorney, Agent, or Firm*—Davis & Bujold, P.L.L.C.

(57) ABSTRACT

A transmission shift system comprising a synchronizing device for idler wheels, which comprises one sliding sleeve that can mesh with a selected idler wheel. The sliding sleeve is arranged non-rotatably and axially displaceable on a shaft with hydraulic actuation being provided. Each sliding sleeve (6) is connected with the shaft (1) via a hub element (7). The synchronizing operation can be implemented as a function of the hydraulic actuation pressure.

13 Claims, 2 Drawing Sheets

HYDRAULICALLY ACTUATABLE GEARSHIFT SYSTEM COMPRISING A SYNCHRONIZING DEVICE

This application is a national stage completion of PCT/EP2003/006735 filed Jun. 26, 2003 which claims priority from German Application Serial No. 102 29 513.1 filed Jul. 2, 2002.

FIELD OF THE INVENTION

The present invention relates to a transmission shift system comprising a synchronizing device for idler wheels.

BACKGROUND OF THE INVENTION

From the state of the art is known of transmission shift systems for idler wheels. In the familiar transmission shift systems, generally, synchronizing devices are provided for the purpose of synchronizing the idler wheels, wherein the devices mechanically actuate the sliding sleeves in order to synchronize the desired idler wheel with a shaft. This way the necessary torque is transmitted from the idler wheel to the shaft or vice versa.

Generally, a displaceable sliding sleeve is used as the shifting element, having an appropriate profile, which slides onto the profile of the counter-piece upon actuation. For this, it is required that the normally existing RPM differential between the idler wheel and the shaft first assumes the value zero. Otherwise, it is not possible to connect the two profiles without resulting in undesirable grating in the transmission. Accordingly, the two profiles should only come into contact with each other when the rotational speeds between the idler wheel to be shifted and the shaft have been balanced. Therefore, a locking synchronizing device is provided, which prevents early shifting through a mechanical locking device.

The publication DE 37 11 490 C2 discloses a gear shifting device. In this gear shifting device, the sliding sleeve is actuated by an adjusting arrangement accommodated in the shaft and operated by means of hydraulic fluid, wherein the arrangement consists of a hydraulically actuatable piston arrangement. A connecting pin, which connects the sliding sleeve with the hydraulic piston arrangement, is provided, which extends through a hole with axial play that is arranged transversely in the shaft. The familiar gear shifting device disadvantageously requires a very complex layout, since the actuating device or piston arrangement is accommodated in the gear shaft. This affects the manufacturing costs of the familiar gear shifting devices negatively.

From the publication GB 2 214 248 A is known of a gear ratio selection mechanism for a motor vehicle transmission. The mechanism utilizes fluid-operated actuators and an electro-hydraulic driver. With a first actuator the desired gear ratio is selected and, with a second actuator, a movement in the direction of the neutral path is enabled, wherein the first actuator activates a desired gear ratio by moving transversely to the neutral path. Furthermore, potentiometers are provided, which allow the respective positions of the actuators to be determined and be passed on to a control system in the form of signals.

It is the object of the present invention to suggest a transmission shift system of the aforementioned kind, which comprises a synchronization device with a simple design of which easy and also secure synchronization can be achieved.

SUMMARY OF THE INVENTION

Accordingly, according to the invention, a transmission shift system with a synchronization device is suggested, in which a synchronizing operation is enabled during the shifting operation in a simple fashion. In particular, additional mechanical components of a locking device can be foregone in the transmission shift system according to the invention. By actuating the sliding sleeve hydraulically and by connecting the sliding sleeve with the shaft, via a hub element, the RPM adjustment of the idler wheel to be shifted and the shaft can be implemented in a simple manner. As a function of the actuation pressure, the sliding sleeve can be axially displaced in such a way that, initially, the existing rotational speed difference between the idler wheel and the shaft is compensated. After the rotational speed adjustment has occurred, the sliding sleeve can then be displaced axially in such a way that the sliding sleeve engages with the idler wheel to be shifted.

Within the framework of further developing the invention, a catch device can be provided for driving the axial movement of the sliding sleeve or of the hub element. The catch device can be a spring-ball element or the like. It can be provided that the hub element comprises a bore in the radial direction in which the spring-loaded ball of the spring-ball unit is guided. The ball is pushed into a groove provided in the sliding sleeve by the spring. Through the actuation pressure acting in the axial direction, the sliding sleeve can be moved in the axial direction. As a function of the amount of the actuation pressure, the catch device releases the sliding sleeve at a predetermined actuation pressure $P_s$ so that it can mesh with the idler wheel once the same RPM exists for the idler wheel and the shaft. It is also conceivable that other mechanically or similarly operated catch devices are used for the transmission shift system according to the invention.

Preferably, the hydraulic actuation of the sliding sleeve is provided by an actuating piston or the like. Upon the piston pressure can be applied via an oil supply system so that the sliding sleeve is displaced axially in a corresponding fashion. It is also feasible that other actuating types are provided for the sliding sleeve.

According to a further beneficial development of the present invention, at least one disk, which is preferably designed as a brake plate, can be provided to adjust the RPMs between the idler wheel to be shifted and the shaft. Every brake plate comprises corresponding friction surfaces, which are preferably coated with a suitable material in order to enable RPM adjustment in the simplest manner.

BRIEF DESCRIPTION OF THE DRAWINGS

The invention will now be described, by way of example, with reference to the accompanying drawings in which.

DETAILED DESCRIPTION OF THE INVENTION

Figure 1:
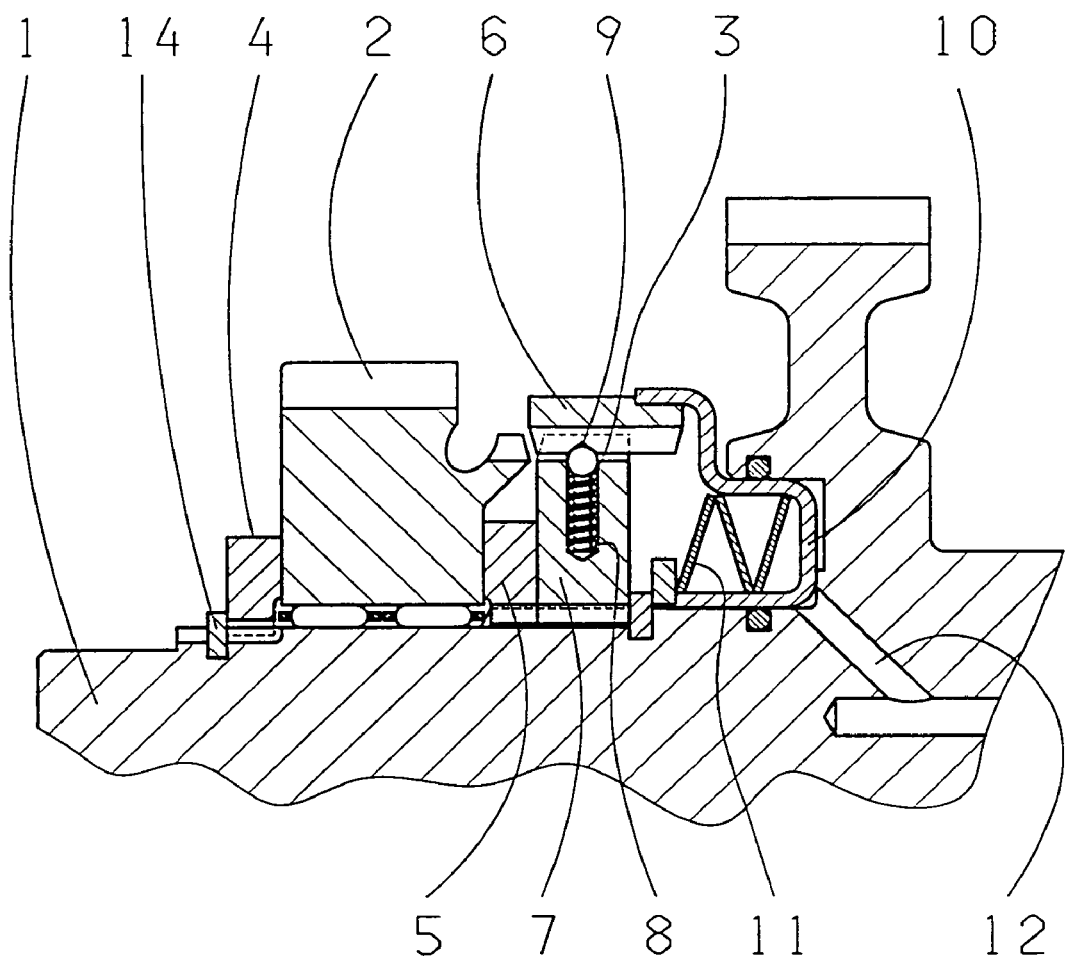
FIG. 1 is a cross-sectional partial view of a possible embodiment of a transmission shift system pursuant to the invention.

FIG. 1 shows a possible embodiment of the transmission shift system according to the invention. The transmission shift system comprises a synchronizing device for idler wheels 2. At least one sliding sleeve 6, which can mesh with an idler wheel 2 that is to be shifted, is provided. The sliding sleeve 6 is arranged non-rotatably and axially displaceable on a shaft 1, wherein the sliding sleeve 6 can be hydraulically actuated by means of an actuating piston 10. The idler wheel 2 is arranged rotatably on the shaft 1 and meshes with additional torque-transmitting elements.

According to the invention, it is provided that the sliding sleeve 6 is connected with the shaft 1 via a hub element 7 wherein, as a function of the hydraulic actuation pressure, an existing RPM difference between the idler wheel 2 to be shifted and the shaft 1 is compensated. Accordingly the shaft 1 and the idler wheel 2 to be shifted are connected so as to transmit torque. This way, the synchronizing operation is achieved with minimal design effort and in the quickest possible fashion.

For the purpose of adjusting the RPMs during the synchronizing operation, the idler wheel 2 to be shifted is clamped between two disk elements 4, 5. The two disk elements 4, 5 are connected non-rotatably with the shaft 1 via profiles, wherein the disk elements 4, 5 each comprise a friction surface on the sides facing the idler wheel 2, said surfaces being suitably coated. The clamping force that is required for the synchronizing operation is applied hydraulically onto the sliding sleeve 6 by the actuating piston 10. The actuating piston 10 is returned into its starting position after synchronizing by means of a return spring 11.

For the purpose of driving the axial motion of the sliding sleeve 6, a suitable catch device is provided on the hub element 7. The catch device comprises, in the embodiment shown here, a so-called spring-ball unit, which is provided in a bore of the hub element 7. A ball 9 of said unit is pushed into a catch groove of the sliding sleeve 6 by a spring element 8.

The selected design of a catch groove 3 combined with the amount of the spring force determines the necessary axial displacement force that must be applied onto the sliding sleeve 6 before said sleeve can move out of the starting position.

If said force is lower than the release force, the sliding sleeve 6 remains locked in its position. Said force can, however, be used to apply a suitable clamping force onto the disk elements 4, 5. This way the disk elements 4, 5 are pressed against the idler wheel 2 to be shifted so that the RPM difference between the idler wheel 2 and the shaft 1 is compensated. Preferably at least the disk element 4 comprises a stop element 14 in the axial direction.

The ball 9 and the spring 8 are guided in a bore in the hub element 7, which is provided loosely displaceable in the axial direction on the shaft 1. The hub element 7 rests directly against the disk element 5. The disk element 5, like the hub element 7, is connected to the shaft 1, via a profile, in order to transmit the necessary torque from the sliding sleeve 6 onto the shaft 1 in the shifted state.

As soon as the force, acting upon the sliding sleeve 6 from the actuation pressure, exceeds the release force, the ball 9 can be pushed out of the groove 3 into the bore against the spring force of the spring element 8, so that the sliding sleeve 6 is axially displaced and can mesh with the idler wheel 2. When the ball 9 is located outside the catch groove 3, the clamping force, that is applied on the idler wheel 2, is also reduced to zero. This way, the corresponding meshing of the two splines of the idler wheel 2 and the sliding sleeve 6 can be beneficially facilitated.

When releasing the connection, the sliding sleeve 6 can be pulled into the opposite direction by the return spring 11 of the actuating piston 10. The ball 9 can reach the catch groove 3 of the sliding sleeve 6 and, this way, the hub element 7 is removed from the disk element 5. Accordingly, the clamping force can be completely eliminated from the idler wheel 2.

Figure 2:
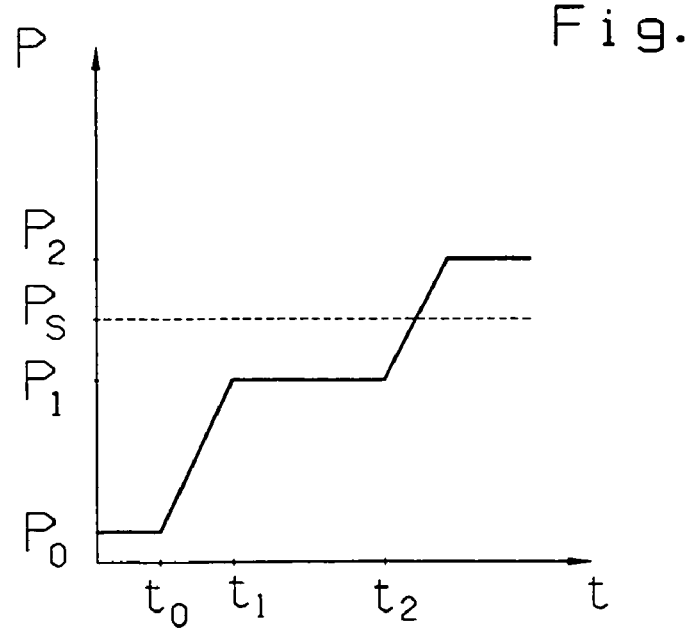
FIG. 2 is a possible course of the actuation pressure during the synchronizing process.

Accordingly, no additional mechanical locking device is required in the transmission shift system according to the invention. The synchronizing operation, provided with the transmission shift system, is essentially accomplished by applying pressure onto the actuating piston 10. The actuation pressure can preferably, as shown in FIG. 2, be adjusted in two steps. In the non-switched state, the actuation pressure can be equal to the pressure $P_0$ at the time $t_0$. The pressure $P_0$ is so low that no force counteracts the return spring 11 of the actuating piston 10.

During the start of a shifting operation, the actuation pressure is increased to its first step, i.e., to the pressure $P_1$. Through the pressure $P_1$ it is accomplished that the actuating piston 10 can be moved against the spring force of the return spring 11, wherein the excess force on the actuating piston 10 is then axially transmitted onto the sliding sleeve 6. The actuation pressure $P_1$, however, is not able to apply sufficient force onto the sliding sleeve 6 to displace it against the catch device.

This way the force is transmitted onto the disk element 5 via the ball 9 and the hub element 7. As long as the actuating pressure $P_1$ is applied, a corresponding clamping force acts upon the idler wheel 2, and the existing RPM difference between the idler wheel 2 and the shaft 1 is compensated. The time during which the application pressure $P_1$ is applied is the corresponding synchronizing time, which is specified by the time interval $t_{1,2}$ in FIG. 2. It should be noted that said time is sufficiently great to enable a suitable speed adjustment. This can occur by measuring the respective rotational speed of the shaft 1 and of the idler wheel 2, whereby the synchronizing time $t_{1,2}$ is determined then. It is also conceivable that the synchronizing time is known since it is known what state all rotating parts in the transmission are in, and the respectively required time for the synchronizing operation can be determined.

When the RPM adjustment has been made, the actuation pressure can be raised to the second step, i.e., to the pressure $P_2$. The actuation pressure $P_2$ is large enough to overcome the release forces on the catch device. This way the sliding sleeve 6 is axially displaced in such a way that it can mesh with the idler wheel 2. It should be noted that the actuation pressure $P_s$, marked in FIG. 2, is the appropriate pressure at which the release takes place. The actuation pressure $P_s$ here is between the two actuation pressures $P_s$ and $P_2$. The amount of the distance from $P_s$ to $P_1$, as well as the amount of the distance from $P_s$ to $P_2$ must each be so large that all system tolerances of the transmission are taken into consideration.

The pressure course, illustrated in FIG. 2, is only provided by way of example so that other random application force progressions are also feasible with the transmission shift system according to the invention.

Figure 3:
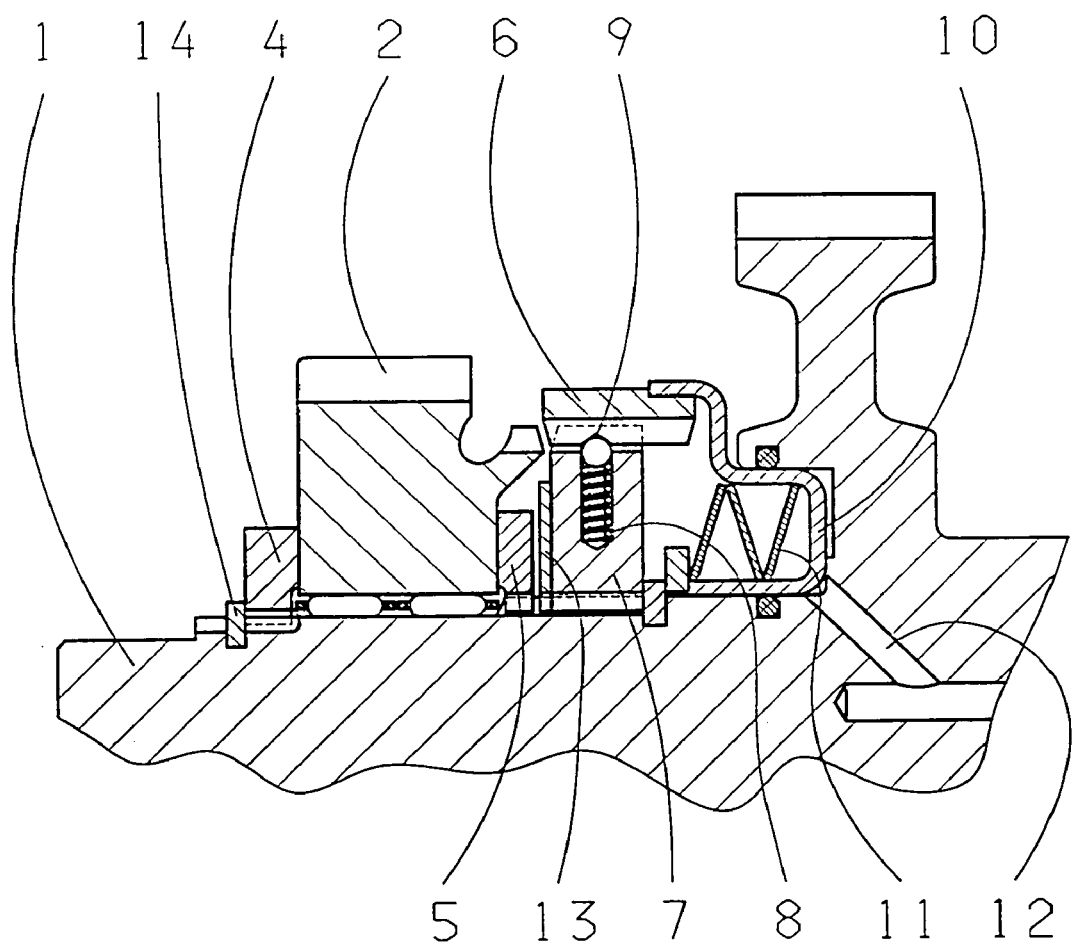
FIG. 3 is a cross-sectional partial view of another embodiment of the transmission shift system pursuant to the invention.

FIG. 3 shows another possible embodiment of the transmission shift system, according to the present invention, wherein identical components were marked with the same reference numerals as in FIG. 1.

The embodiment can be preferably used when greater torque is required to adjust the speed differential between the idler wheel 2 and the shaft 1. This is accomplished in that an additional brake plate 13 is provided in the axial direction between the hub element 7 and the disk element 5. This results in additional friction surfaces, thus being able to apply a greater brake torque onto the idler wheel 2 to be shifted. Preferably, the brake plate 13 has inwardly facing splines, which engage with the same splines that the splines of the sliding sleeve 6 mesh with. Beneficially, this way the usable synchronizing torque doubles as well.

REFERENCE NUMERALS 1 shaft
2 idler wheel
3 catch groove
4 disk element
5 disk element
6 sliding sleeve
7 hub element
8 spring element
9 ball
10 actuating piston
11 return spring
12 oil supply system
13 brake plate
14 stop element

The invention claimed is:

1. A transmission shift system comprising a synchronizing device for an idler wheel (2) comprising a sliding sleeve for engaging with the idler wheel (2), the sliding sleeve (6) being non-rotatably and axially displaceable on a shaft (1) by way of a piston (10) directly connected thereto, the sliding sleeve (6) is supported by the shaft (1) via a hub element (7) and a releasable catch device (3, 8, 9) facilitates axial movement of the sliding sleeve (6) relative to the hub element (7), and a synchronizing operation can be implemented as a function of hydraulic pressure supplied to the piston (10), in a non-switched state, an actuation pressure supplied to the piston (10) is equal to an initial pressure ($P_0$) and no axial movement of the sliding sleeve (6) occurs;

in a release state, the actuation pressure supplied to the piston (10) is above a second pressure ($P_s$), at which the releasable catch device (3, 8, 9) releases the sliding sleeve (6), so that the sliding sleeve (6) becomes axially displaced by the piston (10) relative to the hub element (7) so that the sliding sleeve (6) and the idler wheel (2) engage with one another; and during an RPM adjustment state, the actuation pressure supplied to the piston (10) is at a first pressure ($P_1$), which is greater than the initial pressure ($P_0$) but lower than the second pressure ($P_s$), such that the piston (10) induces axial displacement of the sliding sleeve (6) and the hub element (7) toward the idler wheel (2) so as to compensate for any RPM rotational difference between the sliding sleeve (6) and the idler wheel (2).

2. The transmission shift system according to claim 1, wherein a time duration of the first pressure ($P_1$) is determined by of one of direct indirect measurement of RPMs of the at least one idler wheel (2) and the shaft (1).

3. The transmission shift system according to claim 1, wherein the idler wheel (2) is located between a first and second disk elements (4, 5) and the hub element (7) frictionally engages with one of the first and the second disk elements (4, 5) before the catch device enables axial movement of the sliding sleeve (6) relative to the hub element (7) at the second pressure ($P_s$).

4. The transmission shift system according to claim 3, wherein the catch device comprises a ball-spring unit which comprises a ball (9) that is located in a bore in the hub element (7), and the ball (9) is biased toward a catch groove (3) of the sliding sleeve (6), by a spring element (9), so that the sliding sleeve (6) is temporarily locked to the hub element (7).

5. The transmission shift system according to claim 1, wherein the piston (10) is connected with an oil supply system (12) for supplying the hydraulic pressure via the shaft (1) for hydraulic actuation of the sliding sleeve (6).

6. The transmission shift system according to claim 5, wherein the piston (10) is biased into a starting position by a return spring (11).

7. The transmission shift system according to claim 1, wherein an additional brake plate (13) is provided for the rotational speed adjustment of the at least idler wheel (2).

8. The transmission shift system according to claim 1, wherein the idler wheel (2), the first and the second disk elements (4, 5) and the hub element (7) are all located between first and second stop elements (14).

9. The transmission shift system according to claim 1, wherein the piston (10) is biased into a start position by a return spring (11) and the sliding sleeve (6) is directly connected to the piston (10) such that the return movement of the piston to its start position disengages the sliding sleeve (6) from the idler wheel (2).

10. A transmission shift system comprising a synchronizing device for an idler wheel (2) comprising a sliding sleeve (6) for meshing with the idler wheel (2), the sliding sleeve (6) being arranged non-rotatably and axially displaceable along a shaft (1) and being actuated by hydraulic pressure, the sliding sleeve (6), being connected with the shaft (1) by a hub element (7), and a synchronizing operation of the sliding sleeve (6) with the idler wheel (2) is implemented as a function of the hydraulic pressure;

in a non-switching state, the hydraulic pressure is equal to an initial pressure ($P_0$) at which no axial movement of the sliding sleeve (6) occurs;

in a release state of the sliding sleeve (6), the hydraulic pressure is at or above a second pressure ($P_s$) such that the sliding sleeve (6) is axially displaced so that the sliding sleeve (6) meshes with the idler wheel (2); and during an RPM adjustment state, the hydraulic pressure is raised to a first pressure ($P_1$), greater than the initial pressure ($P_0$) but lower than the second pressure ($P_s$), so that axial displacement of the sliding sleeve (6) and the hub element (8) occurs for RPM adjustment of the idler wheel (2); and the idler wheel (2) to be shifted is arranged between two disk elements (4, 5), and a required clamping force is applied to the two disk elements (4, 5) by the hydraulic pressure present on the sliding sleeve (6) such that the two disk elements (4, 5) frictionally clamp the idler wheel (2) therebetween and compensate for any RPM difference.

11. A transmission shift system comprising a synchronizing device for an idler wheel (2) comprising a sliding sleeve (6) for meshing with the idler wheel (2), the sliding sleeve (6) being arranged non-rotatably and axially displaceable along a shaft (1) and being actuated by hydraulic pressure, the sliding sleeve (6) being connected with the shaft (1) by a hub element (7), and a synchronizing operation of the sliding sleeve (6) with the idler wheel (2) is implemented as a function of the hydraulic pressure;

in a non-switched state, the hydraulic pressure is equal to an initial pressure ($P_0$) at which no axial movement of the sliding sleeve (6) occurs;

in a release state of the sliding sleeve (6), the hydraulic pressure is at or above a second pressure ($P_s$) such that the sliding sleeve (6) is axially displaced so that the sliding sleeve (6) meshes with the idler wheel (2); and during an RPM adjustment state, the hydraulic pressure is raised to a first pressure ($P_1$), greater than the initial pressure ($P_0$) but lower than the second pressure ($P_s$), so that axial displacement of the sliding sleeve (6) and the hub element (8) occurs for RPM adjustment of the idler wheel (2);

an additional brake plate (13) is provided for the RPM adjustment of the idler wheel (2); and the additional brake plate (13) is provided non-rotatably on the shaft (1) between a second disk element (5) and the hub element (7).

12. The transmission shift system according to claim 11, wherein the idler wheel (2) is located between the second disk element (5) and a first disk element (5).

13. The transmission shift system according to claim 12, wherein respective friction surfaces of the first and second disk elements (4, 5) and a brake plate (13) are coated with a suitable material.

* * * * *